OPERATION OF SERIES CONNECTED GUNN EFFECT DEVICES

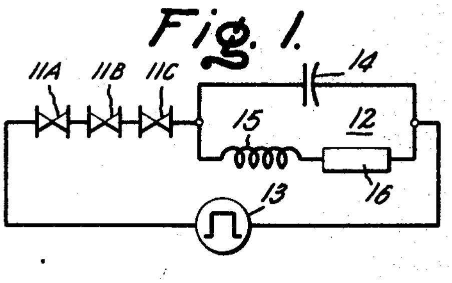
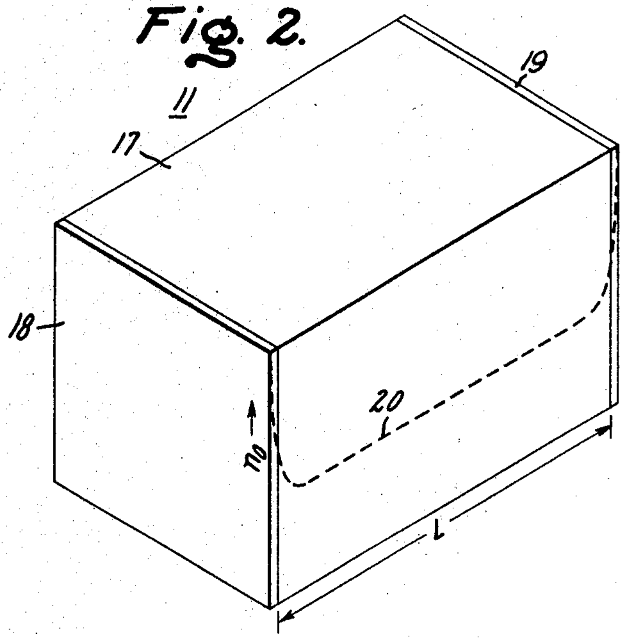
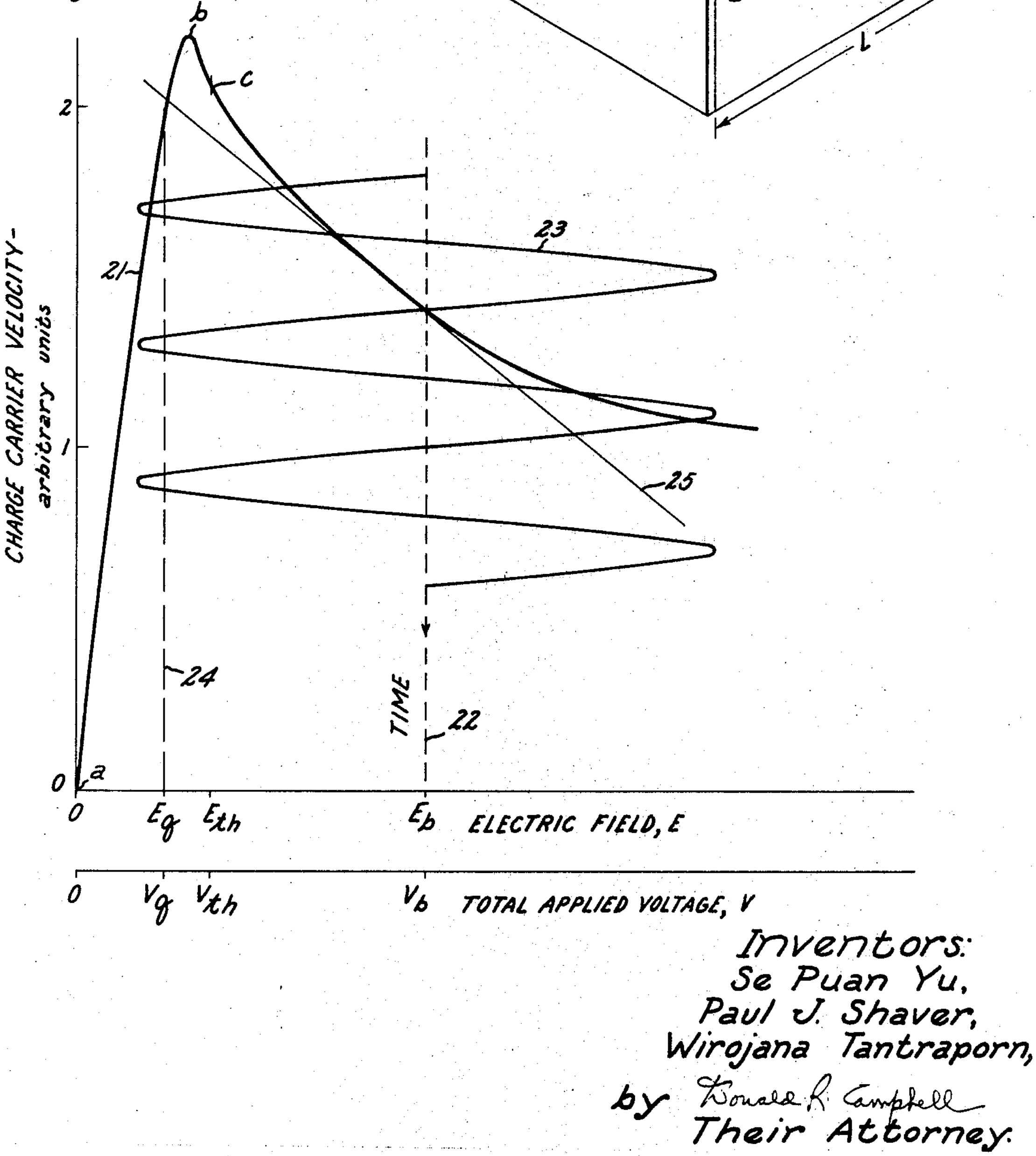
Inventors:
Se Puan Yu,
Paul J. Shaver,
Wirojana Tantraporn,
by Donald R. Campbell
Their Attorney.

Filed June 13, 1968 3 Sheets-Sheet 2

Inventors:
Se Puan Yu,
Paul J. Shaver,
Wirojana Tantraporn,
by Donald R. Campbell
Their Attorney.

OPERATION OF SERIES CONNECTED GUNN EFFECT DEVICES
Filed June 13, 1968 3 Sheets-Sheet 3
Fig. 7.
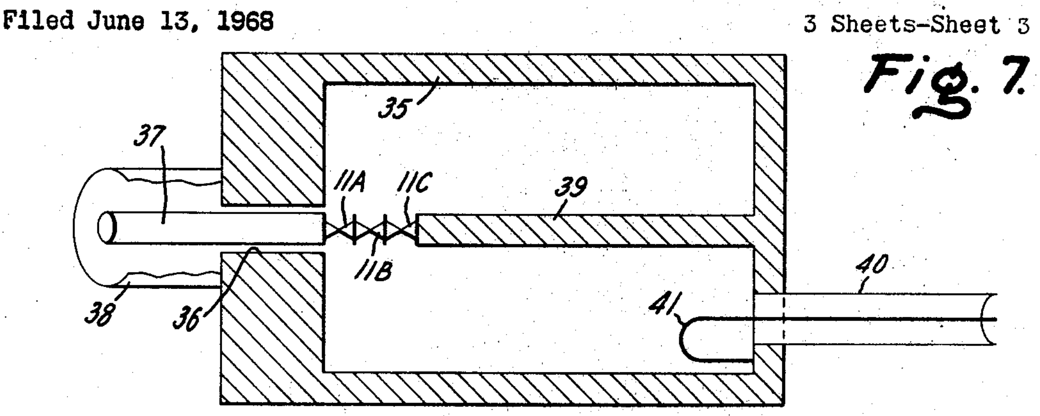
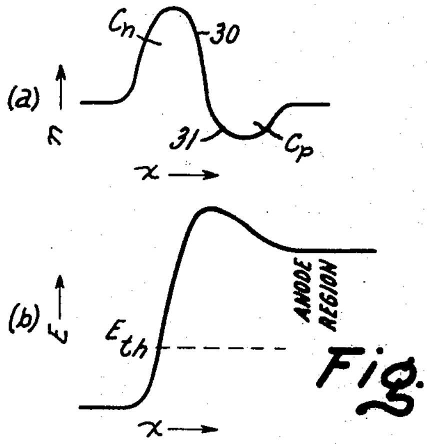
Fig. 5.
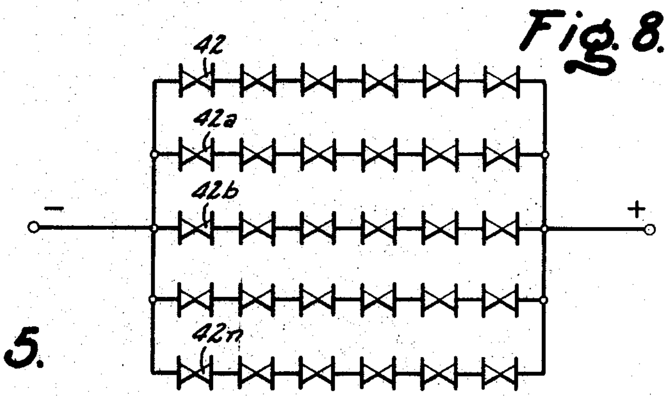
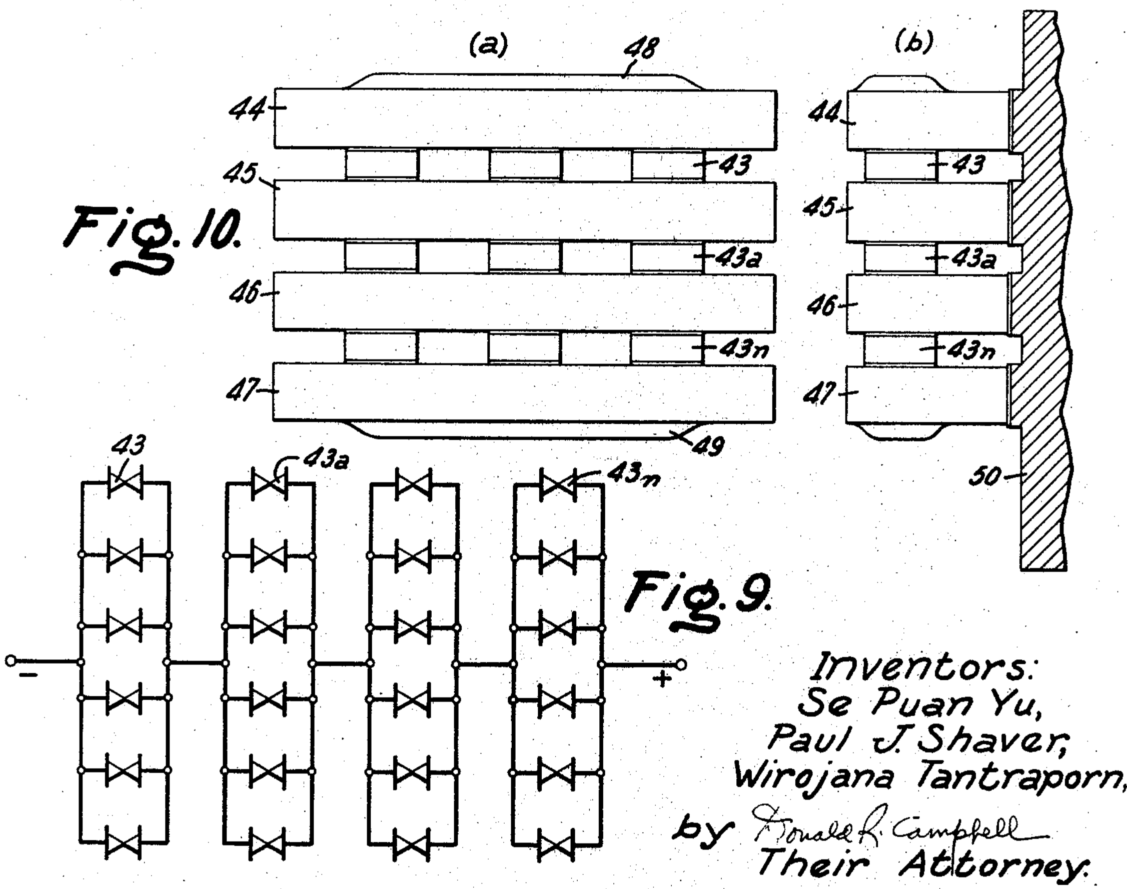
Fig. 10. Fig. 9.
Inventors:
Se Puan Yu,
Paul J. Shaver,
Wirojana Tantraporn,
by Donald R. Campbell
Their Attorney.

United States Patent Office 3,516,018 Patented June 2, 1970

3,516,018 OPERATION OF SERIES CONNECTED GUNN EFFECT DEVICES

Se Puan Yu, Schenectady, Paul J. Shaver, Scotia, and Wirojana Tantraporn, Schenectady, N.Y., assignors to General Electric Company, a corporation of New York Filed June 13, 1968, Ser. No. 736,694
Int. Cl. H03b 7/06
U.S. Cl. 331—107 10 Claims

ABSTRACT OF THE DISCLOSURE

Series or series-parallel operation of non-identical Gunn diodes matched to within 20 percent is obtained in a miniaturizable arrangement suitable for a high power microwave source. The diodes are connected in series with a parallel resonant circuit such that the total voltage due to the superimposed RF voltage and a specified minimum biasing voltage swings below the domain quenching value in each RF cycle. The frequency of series operation is high enough so that an inequality relation between the average negative dielectric relaxation time and the RF period is satisfied whereby high field domains cannot be fully formed.

This invention relates to series connected Gunn effect devices, or Gunn diodes, and more particularly to the device, circuit, and operating conditions required for the effective operation of two or more non-identical Gunn effect devices connected in series circuit relationship so that each device contributes to the generated radio frequency power. These series Gunn diode circuits can be miniaturized and can be expanded to series-parallel arrangements to provide a compact, high power microwave source.

The conventional Gunn diode operated in a resistive circuit in the Gunn mode produces coherent microwave current oscillations having a period proportional to the transit time for a moving high field space charge dipole domain to traverse the length of the device between the electrodes. When the applied voltage exceeds the threshold voltage and lies within the negative resistance range, the high field domain usually nucleates in the vicinity of the cathode and grows larger as it propagates toward the anode, and as it is collected at the anode a new domain is nucleated near the cathode. Because of the physical limitations of a transit-time operated solid state device, the conventional Gunn diode has low power capabilities. The diode can also be operated in a resonant circuit which superimposes on the bias voltage an RF voltage having a frequency higher than the transit-time frequency such that in each cycle the total voltage oscillates from values above the threshold voltage to values below the quenching voltage. Upon cycling below the quenching voltage, the high field domain in the case of the quenched domain mode of operation, or the space charge accumulation layer in the case of the limited space charge accumulation diode, is quenched in the interelectrode space. Although higher frequencies and pulsed output powers can be acheived, the average output power is found in practice to be roughly the magnitude of the conventional Gunn diode.

To obtain substantially higher output power levels, suitable for use as a high power microwave source, for instance, it is necessary to use a plurality of diodes or a single large area device. Parallel operation of Gunn diodes suffers from the same disadvantage as the single large area device, that the net generator impedance becomes impractically low. Moreover, the single large area device requires a geometrically very large and electrically uniform crystal of gallium arsenide or other suitable semiconductor material, which is difficult to fabricate and to heat sink. For these reasons, series connected Gunn diodes offer the most promising method at present of obtaining large amounts of power from solid state devices in the microwave region. A series chain not only combines the RF power generated by each diode but also increases the net generator impedance. Since higher power Gunn diodes individually are low impedance devices, the increase in generator impedance is an important feature in practical circuit design. It also becomes a straight-forward matter to combine parallel connections with series connections to produce a series-parallel array of diodes.

It is theoretically possible to operate a plurality of series connected identical Gunn diodes in either a resistive or a resonant circuit, but it is not commercially feasible to manufacture devices with exactly identical electrical parameters. If non-identical Gunn diodes are connected in series circuit relationship and operated in a conventional manner, one of them tends to capture most of the applied bias voltage. This leaves the remainder of the devices with insufficient bias voltage, and instead of generating microwave energy, the diodes with insufficient bias voltage act as dissipative loads. In order to get each diode in a series chain to generate its portion of the total output of microwave power, some means must be devised to insure that the applied voltage is divided more or less equally or proportionately among the individual diodes. The operation of several Gunn diodes in series, each spaced one half wavelength apart in a resonant microwave cavity, has been reported. Since a large electrical separation between each of the diodes (one half wavelength) is essential to operation in this manner, this technique does not lend itself to miniaturization, and it is not certain from the data given that all of the diodes were generating a share of the total output power.

Accordingly, an object of the invention is to provide a new and improved source of high power radio frequency current comprising a plurality of non-identical series connected Gunn effect devices wherein each of the individual devices contributes to the total output power.

Another object is to define an improved set of necessary device, circuit, and operating conditions to insure the practical operation of non-identical series connected Gunn diodes.

Yet another object of the invention is the provision of a new and improved circuit for generating high power microwave oscillations by means of a plurality of non-identical Gunn diodes connected in series circuit relationship, wherein the circuit has a relatively simple configuration and does not require any appreciable physical or electrical separation between the individual diodes, although some physical separation may be introduced for heat dissipation purposes.

A further object is to provide an improved high power microwave generator capable of being miniaturized and comprising a large number of non-identical Gunn effect devices arranged in a series-parallel array.

In accordance with the invention, a compact higher power microwave source comprises a plurality of non-identical Gunn effect devices connected in series circuit relationship in physical proximity with one another, and in series with a parallel resonant circuit for producing a radio frequency voltage. The individual Gunn devices are made of semiconductor material having certain physical parameters matched to within a predetermined tolerance, and more specifically the average negative dielectric relaxation times of the devices must be matched to within 20 percent and the product of equilibrium charge carrier concentration and cross-sectional area of the individual devices must be matched to within 20 percent. Each device further has the capability of nucleating completely formed high field dipole domains when the threshold voltage is exceeded. Bias means are provided for applying to said series connected Gunn devices and parallel resonant circuit a biasing voltage whose magnitude for each device is at least about 1.8 times the threshold voltage of each device. The parallel resonant circuit is tuned to an RF frequency which satisfies an inequality relation that the ratio of the average negative dielectric relaxation time of the semiconductor material to the RF period is 0.15 or greater, whereby the high field space charge domain nucleating in each Gunn effect device is incompletely formed and has a substantial net negative space charge. The parallel resonant circuit additionally has an RF impedance such that the total voltage applied to each device due to the superimposed biasing voltage and RF voltage oscillates in each RF cycle between a value above the threshold voltage and a value below the domain quenching voltage, whereby the incompletely formed high field domain of each individual device in the series connection is quenched somewhere in the interelectrode space.

The foregoing and other objects, features, and advantages of the invention will be apparent from the following more particular description of several preferred embodiments of the invention, as illustrated in the accompanying drawings wherein:

FIG. 1 is a schematic circuit diagram of a simplified tuned circuit for operating several series connected non-identical Gunn effect devices according to the teaching of the invention;

FIG. 2 is a diagrammatic isometric view of a single Gunn diode drawn to an enlarged scale further showing a curve of donor doping density with respect to the longitudinal dimension of the diode;

FIG. 3 is a characteristic curve of charge carrier velocity versus both average electric field and total applied voltage on which is superimposed a curve of applied RF voltage versus time to illustrate graphically the instantaneous total voltage due to the superimposed D-C bias voltage and RF voltage;

Figure 6:
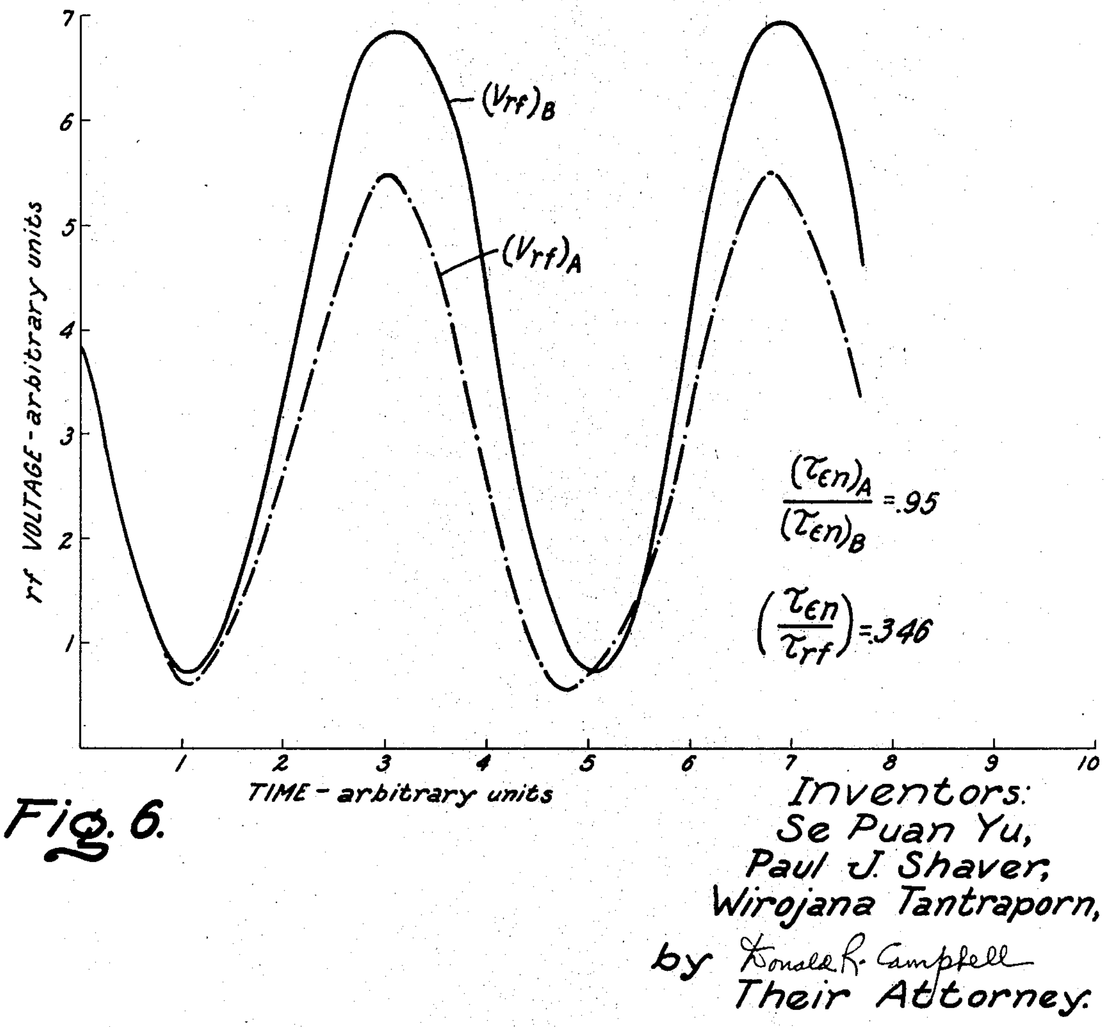

FIGS. 5*a* and 5*b* are respectively typical curves of donor density *n* and electric field E versus the longitudinal dimension of an individual diode operated according to the invention to nucleate incompletely formed high field dipole domains;

FIG. 6 shows computed RF voltage versus time characteristics for two series connected non-identical diodes illustrating that each contributes to the output power;

FIG. 7 is a diagrammatic cross-sectional view of one possible physical implementation of the simplified circuit of FIG. 1;

FIGS. 8 and 9 are schematic circuit diagrams of two different series-parallel arrays of Gunn diodes which each can produce sufficient power to serve as a high power microwave generator; and FIGS. 10*a* and 10*b* are diagrammatic front and side views of a packaging arrangement for diodes connected in accordance with the FIG. 9 circuit.

The simplified circuit shown in FIG. 1 includes three Gunn effect devices 11A, 11B, and 11C connected in series circuit relationship in physical proximity with one another and with a parallel resonant circuit 12, the series circuit so formed being connected across the terminals of a source of unidirectional pulses 13. The parallel resonant circuit 12 comprises a capacitor 14 connected in parallel circuit relationship with the series combination comprising an inductor 15 and a resistor 16, where the resistor 16 is an equivalent resistance including the resistance of the inductor 15 and a preselected RF load. The series connection of Gunn diodes may be operated on a pulse or continuous (C.W.) basis, and the source can be either a unidirectional or bidirectional source. It will be further understood that although three series connected Gunn diodes illustrated, the circuit can be employed, within reasonable limitations, to effect series operation of any number of series connected Gunn effect devices. In order to obtain series operation of non-identical diodes so that each individual diode contributes to the total output power, there are six essential device, circuit, and operating conditions which must be satisfied. These six conditions will be explained with regard to FIGS. 2–6 of the drawing and will be listed in complete form later. In more general terms they are, briefly: that each of the diodes must be capable of producing high field domain Gunn oscillations when individually operated in a resistive circuit; that, although the diodes are not identical, certain physical characteristics of the individual diodes must be matched to within predetermined allowable tolerances; that the total bias voltage applied to the series chain of diodes exceeds a predetermined value related to the number of diodes; that the series chain be operated in a tuned resonant circuit; that the RF impedance of the tuned circuit at the frequency of series operation be chosen to have a predetermined value; and that the frequency of the tuned resonant circuit, and hence the frequency of operation of the series chain of diodes, must be high enough to prevent the formation of a complete high field Gunn dipole domain in any of the individual diodes.

Referring to the enlarged sketch in FIG. 2, the device 11 comprises a crystal 17 of n-type gallium arsenide, or other semiconductor material such as cadmium telluride or zinc selenide inherently capable of producing Gunn oscillations, having at two opposing ends a cathode electrode 18 and an anode electrode 19. The crystal 17 is preferably a rectangular parallelepiped, and has a nominally constant longitudinal donor doping density profile as shown by the superimposed curve 20, wherein the net electron donor concentration $n_0$ is plotted against diode length L as the abscissa. Although as to its gross features the average longitudinal donor doping density is substantially constant over most of the length of the diode, it will be realized that there are naturally occurring random variations and possibly local concentrations of greater or lesser doping density when viewed on a smaller scale. The steeply rising portions of the curve 20 in the vicinity of the cathode 18 and the anode 19 indicate the heavily doped regions formed by applying ohmic contacts to opposing ends of the semiconductor crystal. These electrodes are commonly made of a metal such as tin which acts as a donor impurity for the semiconductor crystal 17. To effect series operation of a plurality of series connected devices, it is necessary that the average negative dielectric relaxation times of the diode be matched to within 20 percent and that the product of the average net electron donor concentration and the cross-sectional areas of the individual diodes (the product $n_0$A) be matched to within 20 percent. The allowable tolerance on the physical lengths of the individual diodes is larger than this percentage figure. It should be understood that when the individual diodes are constructed from portions of semiconductor material having identical electron mobility characteristics, the matching condition on negative dielectric relaxation times is simplified to the requirement that electrical charge carrier concentrations of the diodes are matched to within 20 percent.

Another condition for series operation is that each of the diodes must be capable of producing high field domain Gunn oscillations when individually operated in a resistive circuit in the Gunn mode, i.e., the $n_0L$ product of the semiconductor diode is larger than the well-known critical value. The Gunn mode will be further explained as an aid to understanding the series mode of operation. As was previously mentioned, when the D-C biasing voltage applied to the terminals of the diode exceeds the threshold voltage, a high field space charge dipole domain tends to form somewhere in the interelectrode space and usually nucleates in the vicinity of the cathode electrode 18 in the region of increased donor doping density. The electric field distribution in the crystal 17 breaks up into a high field domain and a lower field region. This situation is inherently unstable, and the high field domain propagates across the device toward the anode electrode and as it is collected at the anode electrode a new high field domain is nucleated at the cathode. The frequency of the resulting current oscillations is proportional to the domain transit time and is known as the Gunn frequency. By way of background into the explanation for the Gunn effect in certain semiconductor materials, it s now generally accepted that the Gunn effect, which is also known as the two-valley electron transfer effect, is associated with the transfer of hot electrons between conduction band valleys separated in energy by a fraction of an electron-volt. The lowest energy conduction band valley is the normal electron conduction band, and a high electric field causes the hot electrons to transfer from the low energy, high mobility valley to the unfilled higher energy, low mobility conduction band valley where they are less effective in the conduction process. If the rate at which electrons are transferred to the low mobility valley is high enough, the total current through the diode will decrease even though the electric field is being increased. Thus, the transferred electron effect gives rise to a voltage controlled bulk negative differential resistance that causes the output current oscillations.

The negative resistance region for Gunn effect semiconductor materials is clearly evident in the charge carrier velocity-electric field characteristic curve 21 shown in FIG. 3. Between the origin of the curve at point *a* and the peak of the curve at point *b* at which maximum charge carrier velocity occurs, the charge carrier velocity, and therefore also the output current since current is proportional to charge carrier velocity, depends on the characteristics of the low energy, high mobility conduction band valley alone and the device substantially follows Ohm's law from point *a* to point *b*. That is, as the applied electric field E is increased, the charge carrier velocity increases also. Between the point *b* at which maximum charge carrier velocity occurs and the point *c*, deviations from Ohm's law begin to be substantial and the device has begun to enter the negative differential resistance region. In the negative resistance region the charge carrier velocity decreases even though the electric field is being increased, and this is due to the electron transfer effect just described in which some electrons are transferred to a lower mobility valley where they are less effective in the conduction process. The electric field at point *c* is known as the threshold field $E_{th}$, and is the minimum applied average field value at which high field dipole domains are formed and Gunn oscillations are produced. The biasing electric field $E_b$, of course, must exceed the threshold field $E_{th}$ and furthermore is within the negative resistance region of the curve 21 (not all of the velocity-field static characteristic is shown here).

A requirement for the series operation of N series connected diodes is that the biasing voltage $V_b$ must be greater than 1.8 N times the threshold voltage $V_{th}$ for hig field domain Gunn oscillation of any individual diode in the series chain. More specifically the biasing voltage must be large enough to insure that the following inequality holds for each diode:

$$\int_{t=t_1}^{t_1+\tau_{RF}} dt \int_{x=0}^{L} dx\{n(x,t)v(E_{tot})E_{RF}(t)\}>0$$

where $\tau_{RF}$=RF period

L=length of diode $n(x,t)$=free electron density as a function of position, $x$, and time, $t$.

$v(E_{tot})$=electron velocity as a function of total electric field strength.

$E_{tot}(x,t)=E_b+E_{RF}(t)+E_{s.c.}(x,t)$ $E_b$=biasing field $E_{RF}(t)$=circuit field $E_{s.c.}(x,t)$=space charge field This relation holds true whether the bias voltage $V_b$ is applied on a pulse basis or on a continuous basis. The bias voltage applied to each of the diodes is preferably about twice its threshold voltage, or more, but there is marginal operation when the bias voltage of any one diode is about 1.8 times its threshold voltage. A typical value of the bias voltage is indicated by dashed line 22 in FIG. 3.

The waveform of the RF voltage produced by the parallel resonant circuit 12 shown in FIG. 1 is represented by the curve 23 in FIG. 3. The RF impedance of the tuned circuit 12 at the frequency of series operation is preselected such that during a small portion of each RF period the total voltage due to the superimposed bias voltage plus the RF voltage across each individual diode in the series chain is below its quenching voltage $V_q$ for high field Gunn domains. The quenching voltage $V_q$ is indicated by the dashed line 24, and has a value less than that of the threshold value $V_{th}$ because of hysteresis effects found in Gunn devices. As has been pointed out, the frequency of the RF voltage waveform 23 is higher than the Gunn frequency. The total applied voltage due to the superimposed RF voltage and the bias voltage $V_b$ therefore oscillates in each RF cycle from values above the threshold voltage to values below the quenching voltage. Thus, in each RF cycle, an incompletely formed high field dipole domain or a space charge accumulation layer nucleates in the vicinity of the cathode electrode 18, propagates toward the anode electrode growing continuously larger, and then is quenched somewhere in the interelectrode space due to the downward swing of the RF voltage which causes the total voltage to drop below the quenching voltage $V_q$.

An important requirement for series operation is that the parallel resonant circuit 12 is tuned to a frequency whereby the total voltage across any individual diode in a series chain varies fast enough to prevent the formation of a complete high field dipole domain in that diode. In other words, the frequency of operation of the series chain must be high enough to prevent formation of a complete high field Gunn domain in any diode in the series chain. This condition will be satisfied when a certain inequality relation exists between the average negative dielectric relaxation time and the RF period as follows:

$$\frac{\tau_{\epsilon n}}{\tau_{RF}} \geq 0.15$$

where $\tau_{RF}$ is the time period of one RF cycle at the frequency of series operation, and $\tau_{\epsilon n}$ is the average negative dielectric relaxation time of any individual diode in the series chain. A definition of $\tau_{\epsilon n}$ which may be helpful to those skilled in the art is:

$$\tau_{\epsilon n}=\frac{\epsilon}{n_o e|\mu|}$$

where $\epsilon$ is the dielectric constant of the active semiconductor material from which the Gunn diode is constructed, $n_o$ is the equilibrium density of electric charge carriers of charge $e$ in the active material and $|\mu|$ is the absolute value of the slope of a straightline approximation to the shape of the negative resistance portion of the velocity-field characteristic 21 (the slope of the line 25 in FIG. 3). It should be realized that when the individual diodes are constructed from semiconductor crystals that have an essentially the same value of $|\mu|$ then the average negative dielectric relaxation time of each individual diode is only a function of $n_0$. In particular $\tau_{\epsilon n}$ is inversely proportional to $n_0$.

Figure 4:
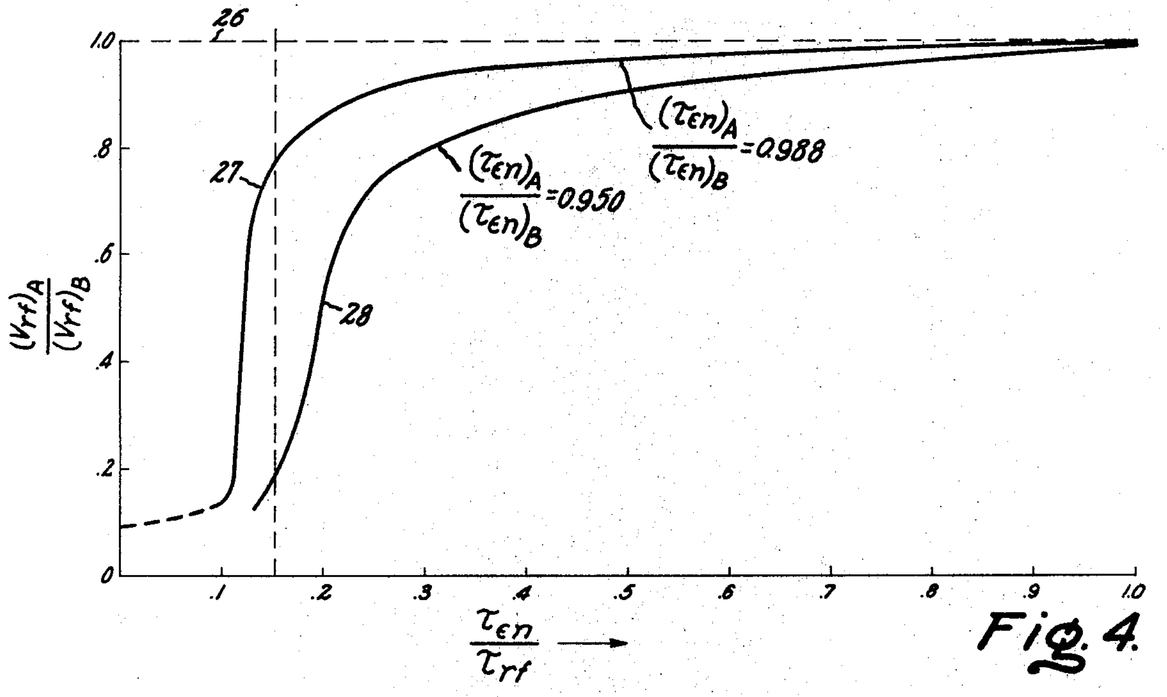
FIG. 4 shows, for a series circuit of two non-identical devices, curves of the calculated division of applied RF voltage between the two devices plotted against the ratio $\tau_{en}/\tau_{RF}$ for two different average negative dielectric relaxation time ratios.

The critical value of the inequality between the negative dielectric relaxation time $\tau_{\epsilon n}$ and the RF period $\tau_{RF}$ is determined from a computed graph of the type given in FIG. 4. With the assumption that there are only two Gunn diodes A and B in the series chain, the ratio of the RF voltages across the two diodes $$\frac{[V_{RF}]A}{[V_{RF}]B}$$

is plotted with respect to the ratio $$\frac{\tau_{\epsilon n}}{\tau_{RF}}$$

In this case $\tau_{\epsilon n}$ is the average negative dielectric relaxation time of diode A. If the two diodes were physically identical and more particularly, if the average equilibrium electrical charge carrier concentrations, $n_0$, in the two diodes were the same then the same RF voltage would appear across each of the diodes and the ratio of the two RF voltages would be exactly 1.0. For exactly identical diodes, then, the curve plotted in FIG. 4 appears as a horizontal line 26. This is given for puposes of comparison since series operation of identical Gunn diodes is generally known in the art and is a trivial case because it is not commercially feasible to produce exactly identical Gunn devices. Curve 27 represents the case for which the diodes are matched to within 1.2 percent, i.e., the ratio of average negative dielectric relaxation times is given by $$\frac{(\tau_{\epsilon n})A}{(\tau_{\epsilon n})B}=0.988$$

Curve 28 is produced when the ratio of average negative dielectric relaxation times is 0.95, and the diodes are matched to within 5 percent. The average abscissa value of the knees in the two curves 27 and 28 is about 0.15, and this is critical value of the ratio plotted as the abscissa, namely, $\tau_{\epsilon n}/\tau_{RF}$. At the critical abscissa value 0.15, it will be noted that only about 20 percent of the voltage appearing across one of the diodes appears across the other diode but at an abscissa value of 0.4, however, the voltage appearing across the two diodes are much more nearly equal.

The concept of the incompletely formed high field space charge dipole domain which under some operating conditions is characteristic of the series operation of Gunn effect devices according to the invention may be more fully understood by reference to the diagrams shown in FIGS. *5a* and *5b*. In FIG. *5a* the donor density $n$ is given as a function of the distance $x$ along the length of the diode. In a dipole domain there is, by definition, an electron accumulation layer 30 which follows an electron depletion layer 31. The electron accumulation layer 30 will of course have a negative space charge, whereas the electron depletion layer 31 has a positive space charge. In an incompletely formed high field dipole domain, the total number $C_n$ of the negative charges in the accumulation layer 30 is appreciably greater than the total number $C_p$ of the positive charges in the electron depletion layer 31, and there is a substantial net negative space charge. Because of this (see FIG. *5b*), the value of the electric field on the anode side of the incompletely formed high field dipole domain will be substantially higher than the value of the electric field on the cathode side of the incompletely formed domain.

The electric charge distribution shown in FIG. *5a* and the electric field distribution shown in FIG. *5b* represent the most general operating conditions encountered in the series operation of Gunn effect diodes. When $\tau_{RF}$ is chosen to be short enough then $C_p$ will be very nearly equal to zero and the series connected Gunn effect diodes will form space charge accumulation layers instead of incompletely formed high field space charge dipole domains.

When the true series operation of a plurality of nonidentical series connected Gunn effect devices is obtained, each of the diodes contributes to the total output power. This is shown graphically in FIG. 6 wherein the computed RF voltages $(V_{RF})A$ and $(V_{RF})B$ for the two diodes A and B are plotted with respect to time. Because the two diodes are not exactly identical the RF voltages across them are not the same but each diode contributes to a greater or lesser extent to the total output power produced. The operation shown in FIG. 6 corresponds to $$\frac{(\tau_{\epsilon n})A}{(\tau_{\epsilon n})B}=0.95 \text{ and } \frac{\tau_{\epsilon n}}{\tau_{RF}}=0.346$$

By satisfying the various device, circuit, and operating conditions which have been described, the capture effect by means of which one diode in the series chain captures all the bias voltage while the other diodes act as dissipative loads is avoided. The set of conditions will be summarized.

*Condition 1.*—Each of the series connected Gunn effect devices is capable of producing complete high field dipole domain Gunn oscillations when individually operated in a restrictive circuit.

*Condition 2.*—The average negative dielectric relaxation times of the diodes are matched to within 20 percent and the products of the average net electron donor concentration and cross-sectional area of each of the individual devices in the series chain are matched to within 20 percent. The allowable tolerance on the physical lengths of the individual devices is larger than 20 percent.

*Condition 3.*—The series connected Gunn effect devices must be operated in a tuned parallel resonant circuit.

*Condition 4.*—In order to achieve oscillation with a series chain of N diodes (N=2, 3, 4, 5, 6, . . . or more), the total applied bias voltage must be greater than 1.8 N times the threshold voltage for Gunn oscillation of any individual diode in the series chain. That is: $V_b>1.8\,N\,V_{th}$, where $V_b$ is the magnitude of the bias voltage applied on either a pulse or continuous basis, and $V_{th}$ is the threshold voltage for a complete high field dipole domain Gunn oscillation of any diode in the series chain.

*Condition 5.*—The RF impedance of the tuned parallel resonant circuit at the frequency of series operation is chosen so that during a small portion of each RF period the total voltage (applied bias voltage plus the RF voltage induced by the tuned circuit) across each individual diode in the series chain is below its quenching voltage for complete high field dipole domains.

*Condition 6.*—The frequency of operation of the series chain must be high enough to prevent the formation of a complete high field dipole domain in any diode in the series chain. That is, the total voltage across each individual diode in the series chain varies fast enough to prevent complete high field dipole domain formation in that diode. For non-identical Gunn effect devices this condition will be satisfied when:

$$\frac{\tau_{\epsilon n}}{\tau_{RF}}\geq 0.15$$

One possible physical implementation of the schematic equivalent circuit shown in FIG. 1 is given in FIG. 7. This apparatus provides a conventional coaxial cylinder resonant microwave cavity and will be described only briefly. One end wall of the coaxial cylinder 35 has a through hole 36 providing a bypass capacitor and into which extends the center conductor 37 of an input signal coaxial line 38 to which is applied the D-C bias voltage, either on a pulse or continuous basis. The non-identical series connected Gunn diodes 11A, 11B, and 11C are connected in physical or electrical separation between the end of the center conductor 37 of the input line 38 and the opposing end of the center conductor 39 of the coaxial cylinder 35. The microwave power generated by this arrangement is coupled to an RF output coaxial line 40 by means of a conventional coupling loop 41.

In order to obtain higher microwave power level outputs in a manner allowing a compact physical arrangement, the total number of Gunn diodes is increased and they are arranged in a series-parallel array. In FIG. 8, a selected number of series chains 42, **42*a*, 42*b* . . . 42*n*** are connected in parallel circuit relationship with one another, and each of the series chains contains any desired number of non-identical series connected Gunn diodes. The series chain of Gunn diodes not only combines the RF power generated by each diode, but also increases the net generator impedance to practical levels, and the parallel connection of several chains of diodes is now possible while still preserving a practically high value of net generator impedance. Since high power Gunn diodes individually are low impedance devices, the ability to control the net generator impedance through the series or series-parallel interconnections of a plurality of Gunn effect diodes is an important practical feature.

FIG. 9 shows another system of interconnection for series-parallel operation. In this arrangement a selected number of non-identical Gunn diodes 43 are connected in parallel circuit relationship with one another, and this parallel diode circuit is connected in series with other parallel groups of non-identical Gun diodes **43*a* . . . 43*n***. It is sufficient to obtain series operation of these parallel groups of diodes that the aforementioned semi-conductor material physical parameters (relating to average negative dielectric relaxation time and product of equilibrium charge carrier concentration and cross-sectional area) for each parallel group taken collectively are matched to within 20 percent. Thus it is possible for any one diode in a parallel group to have these physical parameters not matched to within 20 percent, so long as the parallel group as a whole is matched to within 20 percent of the other parallel groups. Of course, all of the individual diodes in the entire array can be matched to within 20 percent if desired.

As is illustrated in FIG. 10, series-parallel interconnections allow greater flexibility in the design of heat sinking for the RF power generator. It may be desirable to space the individual diodes from one another to create passageways through which a cooling fluid can be circulated. In the illustratory packaging arrangement of FIG. 10, the individual diodes in the parallel groups 43, **43*a* . . . 43*n* are mounted between parallel spaced molybdenum bars 44–47, and electrical contacts 48 and 49 are respectively attached to the outer surfaces of the outer bars in the sandwich. Each individual diode in the array is of course soldered or the like to the bars between which it is mounted. One side of each of the bars 44–47 is also connected by a thermal bond to a heat sink 50** for instance made of beryllia. This arrangement is compact, can be miniaturized, and allows for adequate heat sinking and the circulation of cooling fluid.

In summary, it has been demonstrated that a plurality of non-identical Gunn effect devices connected in series circuit relationship with no required electrical or physical separation can be operated to avoid the capture effect so that each device contributes to the total output power. The circuit arrangement is relatively simple and the tolerances to which the devices must be matched physically are reasonable from a manufacturing standpoint so that series operation becomes commercially feasible. Moreover, the increase in generator impedance obtained by the series connections is an important practical feature. Since the diode circuit can be miniaturized and adequately cooled, a compact, high power microwave source can be constructed using a series-parallel interconnection of Gunn diodes.

While the invention has been particularly shown and described with reference to several preferred embodiments thereof, it will be understood by those skilled in the art that various changes in form and details may be made therein without departing from the spirit and scope of the invention.

What we claim as new and desire to secure by Letters Patent of the United States is:

1. A circuit for generating a radio frequency current comprising the combination of a plurality of non-identical Gunn effect devices having certain predetermined physical parameters matched to within a predetermined percentage and each having the capability of nucleating completely formed high field space charge dipole domains when a threshold voltage is exceeded, means for connecting said Gunn effect devices in series circuit relationship in physical proximity with one another, and in series with a parallel resonant circuit for producing a radio frequency voltage having a desired frequency and corresponding period, and bias means for applying to said series connected Gunn effect devices and parallel resonant circuit a biasing voltage whose magnitude exceeds the threshold voltage of each device by a predetermined amount, said parallel resonant circuit being tuned to a radio frequency which satisfies a predetermined inequality relation between the average negative dielectric relaxation time of the semiconductor material and the period of the radio frequency voltage so that the high field space charge domains nucleating in each diode are incompletely formed and have a substantial net negative space charge, said parallel resonant circuit having an impedance such that the total voltage applied to each device due to the superimposed biasing voltage and radio frequency voltage oscillates in each radio frequency cycle between values above the threshold voltage and values below the domain quenching voltage.

2. A circuit as defined in claim 1 wherein the physical parameters of the Gunn effect devices matched to within a predetermined percentage comprise the average negative dielectric relaxation times of the devices which are matched to within 20 percent and the product of equilibrium charge carrier concentration and cross-sectional area of the individual devices which also are matched to within 20 percent.

3. A circuit as defined in claim 1 wherein the magnitude of the biasing voltage for each device is at least equal to about 1.8 times the threshold voltage of each of the series connected devices.

4. A circuit as defined in claim 1 where in the predetermined inequality relation between the average negative dielectric relaxation time and the period of the radio frequency voltage is that the ratio of the average negative dielectric relaxation time to the radio frequency period at least equals 0.15.

5. A circuit as defined in claim 1 including additional non-identical Gunn effect devices likewise having certain physical parameters matched to within the predetermined percentage, said additional devices each being connected in parallel circuit relationship with at least one of said previously mentioned series connected devices to form a series-parallel array.

6. A compact high power microwave source comprising the combination of a first set of non-identical Gunn effect devices each made of semiconductor material having the average negative dielectric relaxation time and the product of equilibrium charge carrier concentration and cross-sectional area of the individual devices matched to within 20 percent, and having the capability of nucleating completely formed high field space charge dipole domains for transit from one device electrode toward the other when a threshold voltage is exceeded, means for connecting the individual Gunn effect devices of said first set of devices in series circuit relationship with one another in physical proximity, and in series with a parallel resonant circuit for producing a radio frequency voltage having a desired frequency and corresponding period, and bias means for applying to said series connected Gunn effect devices and parallel resonant circuit a biasing voltage whose magnitude for each device is at least about 1.8 times the threshold voltage of each device, said parallel resonant circuit being tuned to a radio frequency greater than the transit-time frequency which satisfies an inequality relation that the ratio of the negative dielectric relaxation time of the semiconductor material to the period of the radio frequency voltage at least equals 0.15, so that the high field space charge domains nucleating in each diode are incompletely formed and have a substantial net negative space charge, said parallel resonant circuit having an impedance such that the total voltage applied to each device due to the superimposed biasing voltage and radio frequency voltage oscillates in each radio frequency cycle between values above the threshold voltage and values below the domain quenching voltage, whereby in each cycle the incompletely formed high field domain is quenched in the interelectrode space.

7. A circuit as defined in claim 1 further including a second set of series connected Gunn effect devices having the aforementioned semiconductor material physical parameters of the individual devices similarly matched to with 20 percent, said first and second sets of series connected Gunn effect devices in turn being connected in parallel circuit relationship to form a compact high power series-parallel array.

8. A circuit as defined in claim 6 wherein said semiconductor material is gallium arsenide, and further including additional sets of series connected non-identical Gunn effect devices having the aforementioned semiconductor material physical parameters of the individual devices similarly matched to within 20 percent, said first set and said additional sets of series connected Gunn effect devices in turn being connected in parallel circuit relationship with one another to form a compact high power series-parallel array.

9. A circuit as defined in claim 6 further including additional non-identical Gunn effect devices each connected in parallel circuit relationship with one of said previously mentioned devices to form at least two parallel groups of devices which in turn are connected in series circuit relationship, the aforementioned semiconductor material physical parameters of each parallel group of devices being collectively matched to within 20 percent.

10. A circuit as defined in claim 6 wherein said semiconductor material is gallium arsenide, and further including a plurality of additional non-identical Gunn effect devices connected in parallel circuit relationship with each of said previously mentioned devices to form a plurality of parallel group of devices which in turn are connected in series circuit relationship, the aforementioned semiconductor material physical parameters of each parallel group of devices being collectively matched to within 20 percent.

No references cited.

JOHN KOMINSKI, Primary Examiner

U.S. Cl. X.R.

317—235